(12) United States Patent
Harrison et al.

(10) Patent No.: US 8,899,145 B2
(45) Date of Patent: Dec. 2, 2014

(54) GRILL INSERTS AND TOOL FOR THE SAME

(75) Inventors: Ryan T. Harrison, Anderson, SC (US);
Thomas Parel, Anderson, SC (US);
Robert Warren, Wyoming, PA (US);
Kenneth M. Brazell, Piedmont, SC (US); Zachary Scott, Easley, SC (US);
Scott Kippes, Anderson, SC (US); Mark Huggins, Anderson, SC (US); Taku Ohi, Greer, SC (US); Jason Porter Whitmire, Greenville, SC (US); Adam Clark, Anderson, SC (US); Robert McCracken, Anderson, RI (US);
Christopher Clearman, Anderson, SC (US)

(73) Assignee: Techtronic Power Tools Technology Limited, Tortola (VG)

( * ) Notice: Subject to any disclaimer, the term of this patent is extended or adjusted under 35 U.S.C. 154(b) by 374 days.

(21) Appl. No.: 13/362,936

(22) Filed: Jan. 31, 2012

(65) Prior Publication Data

US 2012/0192724 A1    Aug. 2, 2012

Related U.S. Application Data

(63) Continuation-in-part of application No. 29/384,505, filed on Jan. 31, 2011, now Pat. No. Des. 671,364, and a continuation-in-part of application No. 29/384,502, filed on Jan. 31, 2011, now Pat. No. Des. 671,363.

(60) Provisional application No. 61/438,314, filed on Feb. 1, 2011.

(51) Int. Cl.
*A47J 37/06*     (2006.01)
*A47J 45/00*     (2006.01)
*F24B 15/00*     (2006.01)
*A47J 45/10*     (2006.01)
*A47J 37/07*     (2006.01)

(52) U.S. Cl.
CPC ............... *A47J 37/067* (2013.01); *A47J 45/10* (2013.01); *A47J 37/0786* (2013.01)
USPC .................. 99/394; 99/422; 99/450; 294/10; 294/13; 294/27.1; 294/31.1

(58) Field of Classification Search
USPC ......... 99/394, 421 A, 422, 450; 126/9 R, 9 B, 126/29, 25 R; 220/759, 752, 756; 16/422, 16/425, 427, 429; 294/10, 12, 13, 27.1, 294/32, 33, 34, 104, 31.1
See application file for complete search history.

(56) References Cited

U.S. PATENT DOCUMENTS 5,277 A    9/1847   Philip
18,434 A   10/1857  Coggeshall (Continued)

FOREIGN PATENT DOCUMENTS

AU    2007221794    10/2007
CA    1190819       7/1985

(Continued)

*Primary Examiner* — Reginald L Alexander
(74) *Attorney, Agent, or Firm* — Michael Best & Friedrich LLP

(57) ABSTRACT

A tool for removing an interchangeable cooking insert from a grill has a handle end and an engagement end. A handle extends from the handle end toward the engagement end. A support arm extends from the handle toward the engagement end. The support arm has a first lateral edge defining a first lifting hook and a second lateral edge defining a second lifting hook. The first lifting hook and second lifting hook are configured to engage a portion of the cooking insert. A support pin extends across the support arm between the first lateral edge and the second lateral edge. A latch member is pivotally coupled to one of the support arm and the handle. The latch member includes a first end selectively engageable with a portion of the cooking insert and a second end extending through the handle for actuation of the latching member by a user.

20 Claims, 15 Drawing Sheets

(56) References Cited

U.S. PATENT DOCUMENTS

| | | | |
|---|---|---|---|
| 28,102 A | 5/1860 | Mingay | |
| 29,300 A | 7/1860 | Nation | |
| 40,146 A | 9/1863 | Phillips et al. | |
| 60,334 A | 12/1866 | Brown | |
| 75,914 A | 3/1868 | Holmes | |
| 81,139 A | 8/1868 | Caven | |
| 101,236 A | 3/1870 | Denman et al. | |
| 145,253 A | 12/1873 | Stuart et al. | |
| 159,693 A | 2/1875 | Marshall | |
| 159,871 A | 2/1875 | Weightman | |
| 161,911 A | 4/1875 | Stout | |
| 171,032 A | 12/1875 | Meyers | |
| 823,415 A | 6/1906 | Kramptiz | |
| 857,210 A | 6/1907 | Stachhouse | |
| 882,151 A | 3/1908 | Koeppen | |
| 893,602 A | 7/1908 | Bond | |
| 1,022,978 A | 4/1912 | Stevenson | |
| 1,133,912 A | 3/1915 | Barrere | |
| 1,178,425 A | 4/1916 | Tant | |
| 1,217,758 A | 2/1917 | Haapanen | |
| 1,241,378 A | 9/1917 | Hendee | |
| 1,245,174 A | 11/1917 | Bacik | |
| 1,248,391 A | 11/1917 | Pentony | |
| 1,367,757 A * | 2/1921 | Schott | 220/759 |
| 1,587,350 A | 6/1926 | Parke | |
| 1,943,585 A | 1/1934 | Cummins et al. | |
| 2,162,961 A | 10/1936 | Mattoon | |
| 2,092,198 A | 9/1937 | Anderson | |
| 2,220,879 A * | 11/1940 | Hayden et al. | 220/284 |
| 2,262,273 A | 11/1941 | Ferrara | |
| 2,478,784 A * | 8/1949 | Serio | 294/31.1 |
| 2,712,151 A | 7/1955 | Becht | |
| 2,808,284 A | 10/1957 | Rasmussen | |
| 3,157,909 A * | 11/1964 | Schmitt | 220/759 |
| 3,269,765 A * | 8/1966 | Pryce | 294/31.1 |
| 3,306,279 A | 2/1967 | Dale | |
| 4,126,120 A | 11/1978 | Bourboulis | |
| 4,215,667 A | 8/1980 | Hsu | |
| 4,345,516 A | 8/1982 | Sinclair | |
| 4,421,016 A | 12/1983 | Sich | |
| 4,471,985 A | 9/1984 | Mahoney | |
| 4,479,422 A | 10/1984 | Wagstaff | |
| 4,492,152 A | 1/1985 | DeSantis | |
| 4,510,855 A | 4/1985 | Avner | |
| 4,524,751 A | 6/1985 | Hoglund | |
| 4,548,192 A | 10/1985 | Hsu | |
| 4,569,279 A | 2/1986 | Avner | |
| 4,607,613 A | 8/1986 | Toldi | |
| 5,048,882 A | 9/1991 | Fielding et al. | |
| 5,069,196 A | 12/1991 | Schlosser et al. | |
| 5,373,608 A | 12/1994 | Welch | |
| 5,458,054 A | 10/1995 | Yu | |
| 5,590,584 A | 1/1997 | Ahn | |
| 5,605,143 A | 2/1997 | Hebert et al. | |
| 5,704,092 A | 1/1998 | Nicollet et al. | |
| 5,887,751 A | 3/1999 | Kroscher | |
| 6,000,100 A | 12/1999 | Montgelard | |
| 6,000,739 A | 12/1999 | Zemit et al. | |
| 6,186,055 B1 | 2/2001 | DeMars et al. | |
| 6,196,115 B1 | 3/2001 | Tsao | |
| 6,250,493 B1 | 6/2001 | Kwan | |
| 6,257,439 B1 | 7/2001 | Hsu | |
| 6,393,973 B1 | 5/2002 | Velo et al. | |
| 6,439,420 B1 | 8/2002 | Park | |
| 6,439,421 B1 | 8/2002 | Lin | |
| 6,526,876 B2 | 3/2003 | Kahler et al. | |
| 6,666,132 B2 * | 12/2003 | Dodane | 99/403 |
| 6,694,868 B1 | 2/2004 | Hung | |
| 6,708,373 B2 | 3/2004 | Dodane | |
| 6,712,412 B2 | 3/2004 | Kahler et al. | |
| 6,739,473 B2 | 5/2004 | Kahler et al. | |
| 6,813,994 B2 | 11/2004 | Williams | |
| 7,007,687 B2 | 3/2006 | Lewis | |
| 7,028,374 B2 | 4/2006 | Fiocco | |
| 7,165,489 B1 | 1/2007 | Fernandez et al. | |
| 7,478,735 B2 | 1/2009 | Lorthioir et al. | |
| 7,481,330 B2 | 1/2009 | Lorthioir et al. | |
| 7,607,387 B2 | 10/2009 | Stanczak | |
| 7,611,179 B2 | 11/2009 | Lorthioir | |
| 7,717,029 B2 | 5/2010 | Rowe et al. | |
| 7,762,182 B2 | 7/2010 | Garziera | |
| 7,841,270 B2 | 11/2010 | Holbrook | |
| 2005/0205076 A1 | 9/2005 | Boucher | |
| 2006/0011072 A1 | 1/2006 | Giornali et al. | |
| 2006/0225725 A1 | 10/2006 | Rinaldo | |
| 2006/0260472 A1 | 11/2006 | Tarlow | |
| 2007/0044785 A1 | 3/2007 | Malafouris | |
| 2008/0245356 A1 | 10/2008 | Chuang | |
| 2008/0289511 A1 | 11/2008 | Mendez | |
| 2009/0045207 A1 | 2/2009 | Lorthioir | |
| 2011/0005037 A1 | 1/2011 | Kim | |

FOREIGN PATENT DOCUMENTS

| | | |
|---|---|---|
| CA | 2523451 | 11/2004 |
| CA | 2530835 | 1/2005 |
| CA | 2635197 | 1/2010 |
| CN | 200954059 | 10/2007 |
| CN | 201286639 | 8/2009 |
| CN | 101700175 | 5/2010 |
| CN | 201524006 | 7/2010 |
| CN | 201691774 | 1/2011 |
| CN | 201767832 | 3/2011 |
| CN | 102160763 | 8/2011 |
| CN | 201996392 | 10/2011 |
| CN | 202015106 | 10/2011 |
| DE | 10100123 | 7/2002 |
| EP | 769263 | 4/1997 |
| EP | 906742 | 4/1999 |
| EP | 1237453 | 9/2002 |
| EP | 1523264 | 4/2005 |
| EP | 1523265 | 4/2005 |
| EP | 1523266 | 4/2005 |
| EP | 1827189 | 9/2007 |
| EP | 1991098 | 11/2008 |
| EP | 2007260 | 12/2008 |
| EP | 2163177 | 3/2010 |
| EP | 2249687 | 11/2010 |
| FR | 2818885 | 7/2007 |
| FR | 2956021 | 8/2011 |
| GB | 2232113 | 5/1990 |
| GB | 2470295 | 11/2010 |
| MX | 106880 | 5/1905 |
| MX | 375 | 4/1995 |
| WO | WO 2009113757 | 9/2007 |
| WO | WO 2008061092 | 5/2008 |
| WO | WO 2008096930 | 8/2008 |
| WO | WO 2009136678 | 11/2009 |
| WO | WO 2010043790 | 4/2010 |
| WO | WO 2010098536 | 9/2010 |
| WO | WO 2011052859 | 5/2011 |
| WO | WO 2011080482 | 7/2011 |

* cited by examiner

GRILL INSERTS AND TOOL FOR THE SAME

CROSS REFERENCE TO RELATED APPLICATIONS

The present application claims priority to U.S. Provisional Patent Application No. 61/438,314, filed Feb. 1, 2011, and is a continuation-in-part of U.S. Design patent application No. 29/384,505, filed Jan. 31, 2011, and of U.S. Design patent application No. 29/384,502, filed Jan. 31, 2011, the entire contents of all of which are hereby incorporated by reference.

FIELD

The present invention relates to outdoor grilling. Grilling is popular as both a recreational activity and a method of cooking.

SUMMARY

A traditional grill offers a wire or cast iron grate on which to cook meats and other foods. Such grates can limit the types of foods which may be cooked upon the grill and/or the method of cooking. The present invention generally relates to interchangeable cooking surfaces for use with an outdoor grill, and a tool for interchanging said cooking surfaces.

In one independent embodiment, a tool for removing an interchangeable cooking insert from a grill is provided. The tool may generally include handle extending from a handle end toward an engagement end and a support arm extending from the handle toward the engagement end. The support arm may have a first lateral edge defining a first lifting hook and a second lateral edge defining a second lifting hook. The first lifting hook and second lifting hook may be configured to engage a portion of the cooking insert. A support pin may extend across the support arm between the first lateral edge and the second lateral edge. A latch member may be pivotally coupled to one of the support arm and the handle. The latch member may include a first end selectively engageable with a portion of the cooking insert and a second end extending through the handle for actuation of the latching member by a user.

In another independent embodiment, an interchangeable cooking insert for use with a grill is provided. The insert may generally include a cooking surface surrounded by an outer ring and a lifting member extending outwardly radially from the outer ring in cantilever fashion. The lifting member may include a distal end, a first lateral edge, and a second lateral edge, a lateral groove extending from the first edge to the second edge, a first lifting ear projecting outwardly from the first edge, and a second lifting ear projecting outwardly from the second edge.

In yet another independent embodiment, a grill accessory combination is provided. The combination may generally include an interchangeable cooking insert and a tool. The insert may include a cooking surface surrounded by an outer ring and a lifting member extending outwardly radially from the outer ring in cantilever fashion. The lifting member may include a distal end, a first lateral edge, and a second lateral edge, a lateral groove extending from the first edge to the second edge, a first lifting ear projecting outwardly from the first edge, and a second lifting ear projecting outwardly from the second edge. The tool may include a handle extending from a handle end toward an engagement end and a support arm extending from the handle toward the engagement end. The support arm may have a first lateral edge defining a first lifting hook and a second lateral edge defining a second lifting hook, the first lifting hook being configured to engage the first lifting ear, the second lifting hook being configured to engage the second lifting ear. The tool may further include a support pin extending across the support arm between the first lateral edge and the second lateral edge, and a latch member pivotally coupled to one of the support arm and the handle, the latch member being configured to selectively engage the distal end while the support pin is at least partially disposed within the lateral groove.

In yet another independent embodiment, a system including an interchangeable cooking insert and a tool for removing the cooking insert from a grill is provided.

In a further independent embodiment, a cooking system including a grill, an interchangeable cooking insert and a tool for removing the cooking insert from the grill is provided.

Other independent aspects of the invention will become apparent by consideration of the detailed description and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

Figure 1:
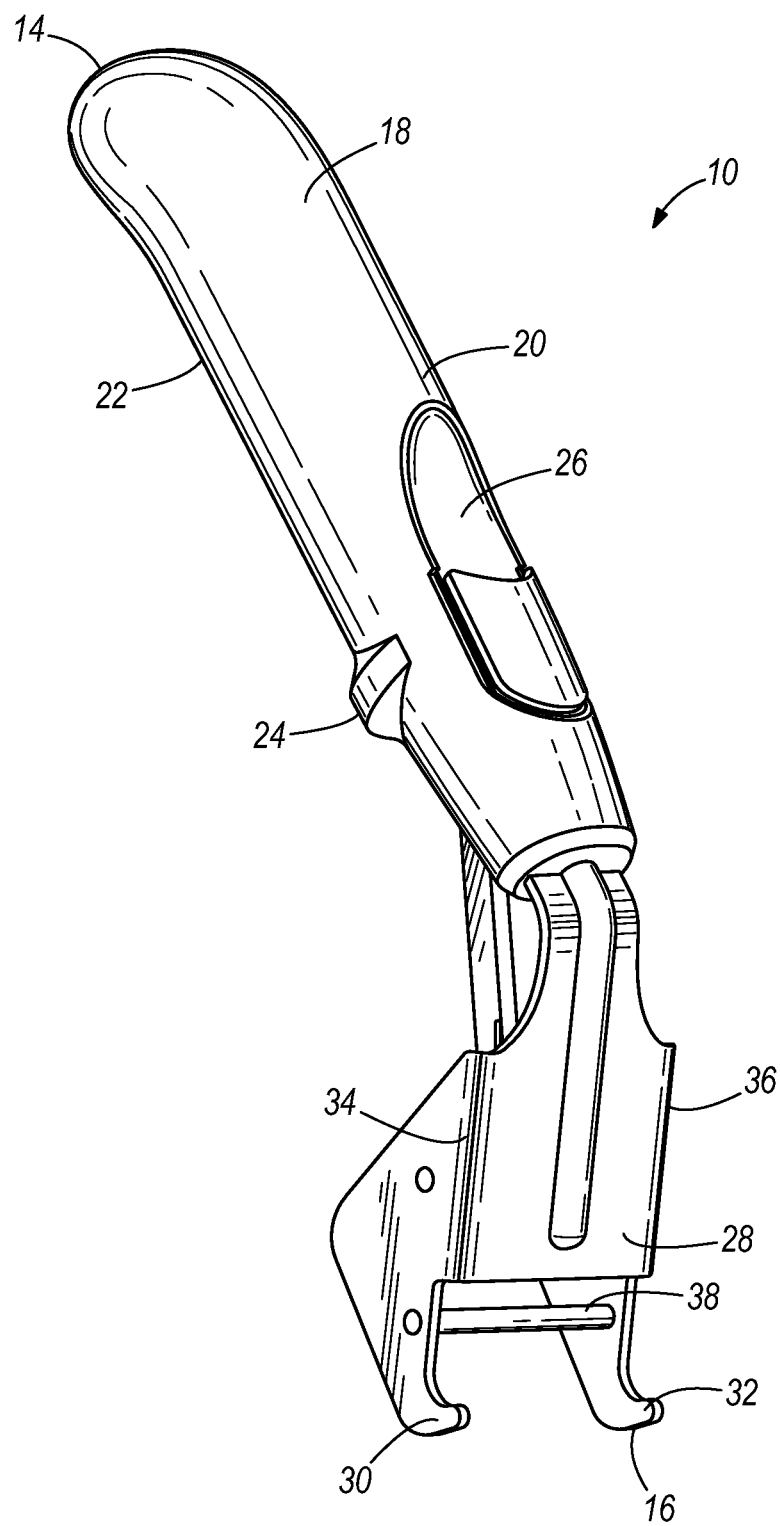
FIG. 1 is a front perspective view of a tool for lifting interchangeable grill inserts.
Figure 4:
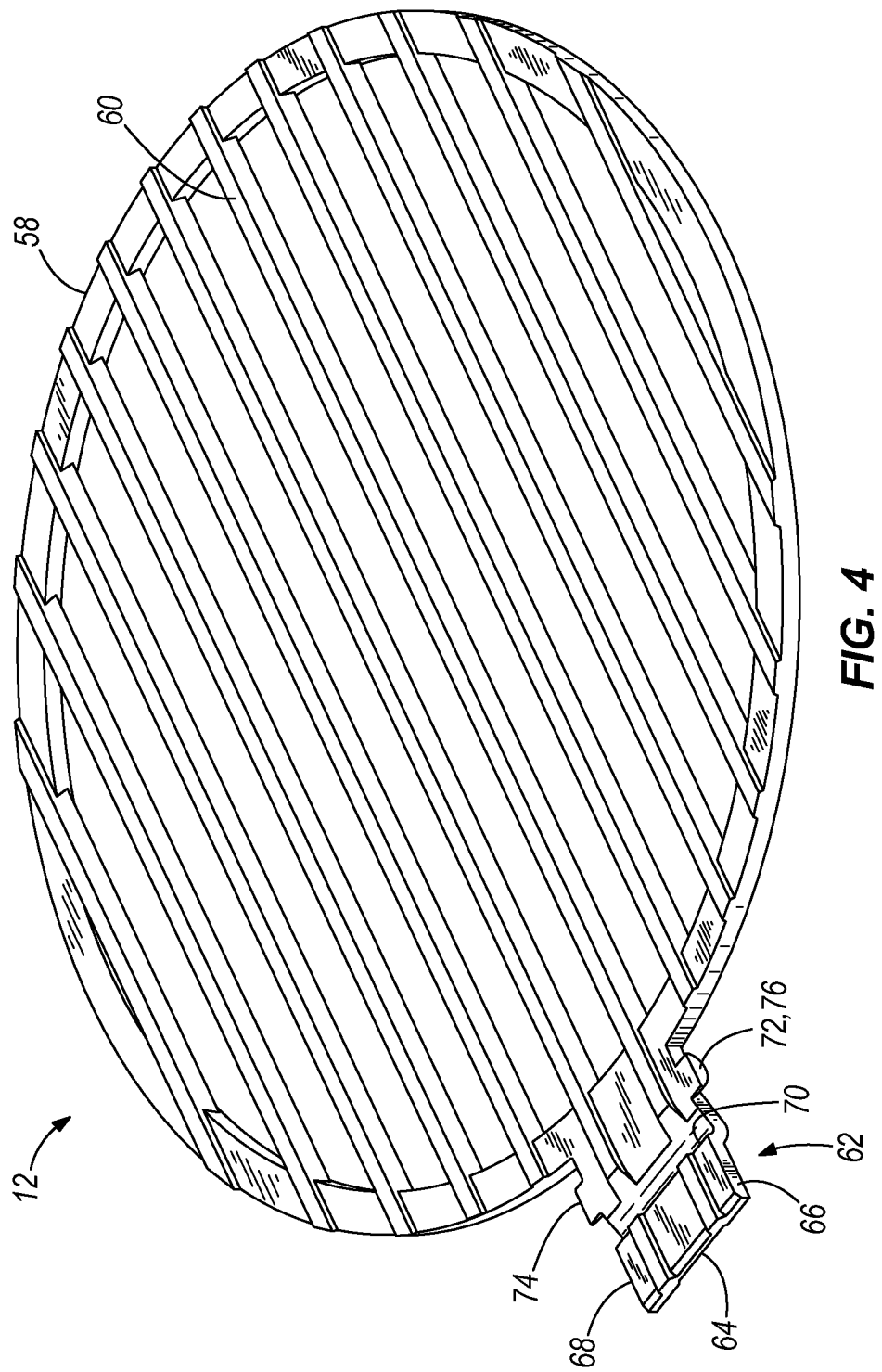
FIG. 4 is a perspective view of a grill insert.
Figure 14:
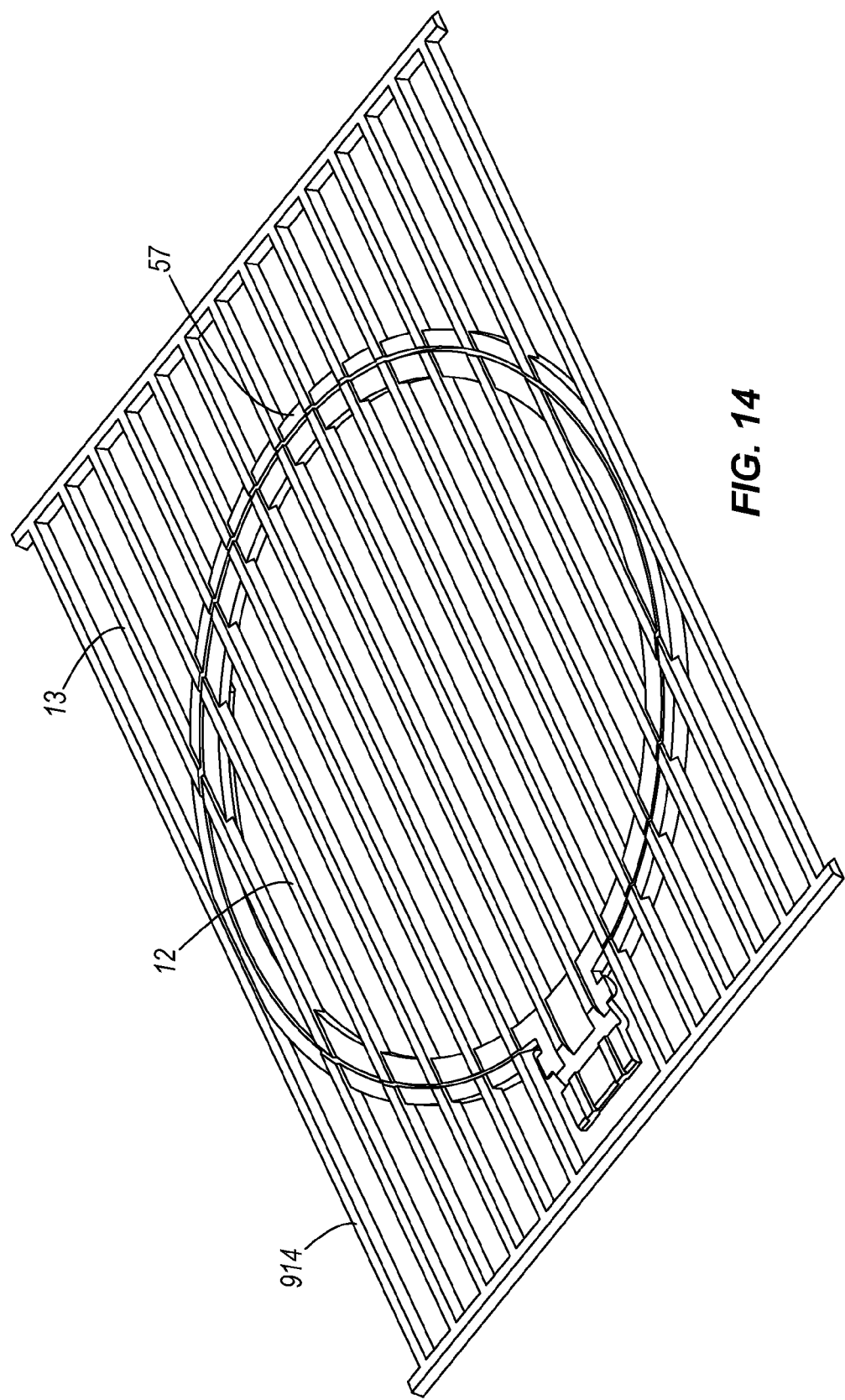
FIG. 14 is a perspective view of the cooking insert shown in FIG. 4 inserted into a rectangular grill grate.
Figure 15:
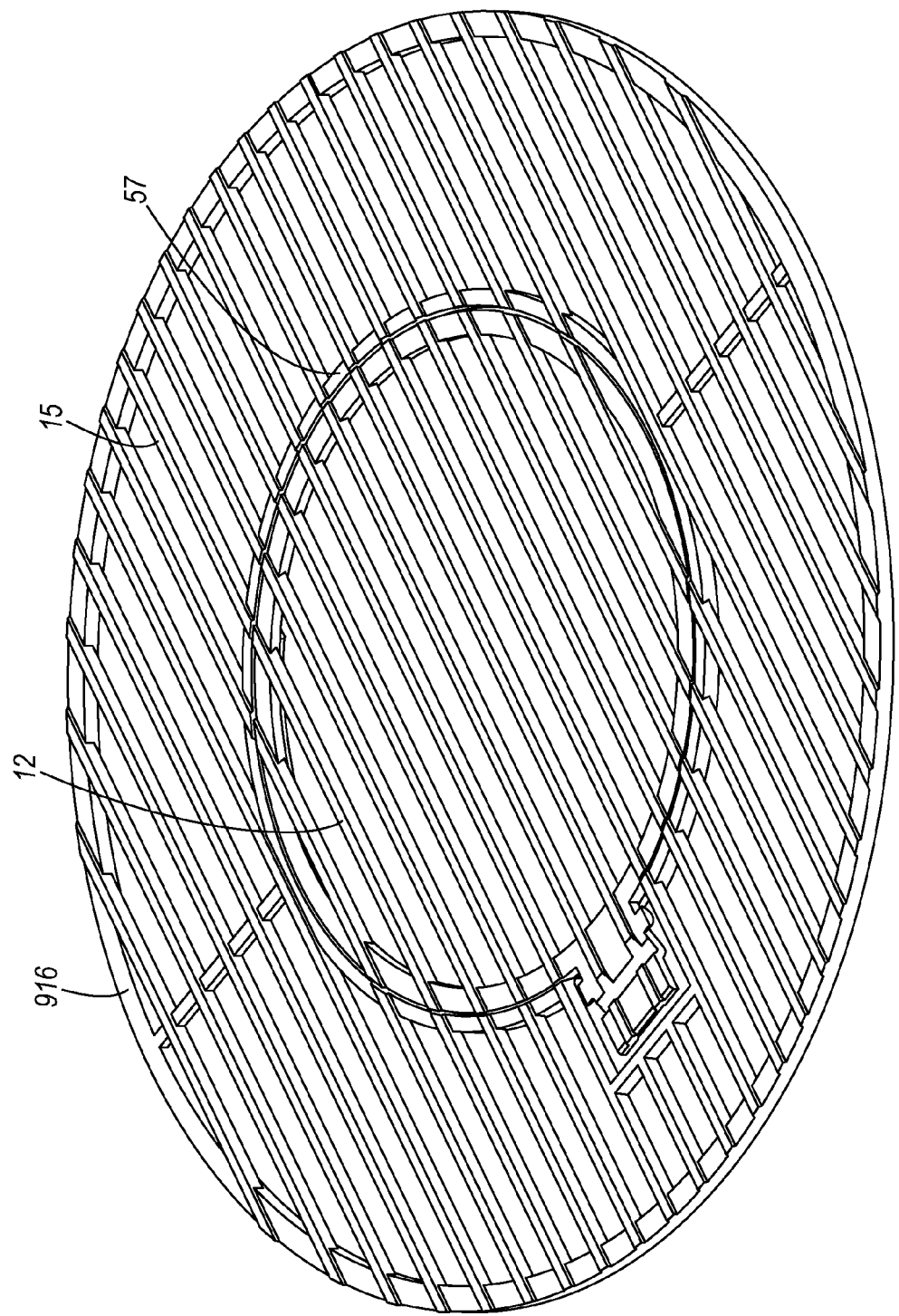
FIG. 15 is a perspective view of the cooking insert shown in FIG. 4 inserted into a round grill grate.

FIG. 1 illustrates a tool 10 that may be used, for example, to lift an interchangeable grill insert 12, such as that illustrated in FIG. 4, from a grill 13 or 15, such as those illustrated in FIGS. 14 and 15, respectively. The tool 10 has a handle end 14 and an engagement end 16. A handle 18 extends from the handle end 14 toward the engagement end 16. The handle 18 is generally cylindrical, with a top side 20 and a bottom side 22. A finger tab 24 projects radially outwardly from the bottom side 22 of the handle 18. The handle 18 defines a thumb-recess 26 on the top side 20. The handle 18 may have a coating material to, for example, provide a cushioned and/or contoured gripping surface for a user's hand, prevent heat transfer to a user's hand, etc.

The engagement end 16 includes a support arm 28 that extends from the handle 18. A first lifting hook 30 and a second lifting hook 32 are coupled to lateral edges 34, 36, respectively, of the support arm 28. In the illustrated embodiment, the lifting hooks, 30, 32 are unitarily formed as one piece with the support arm 28. The support arm 28 and the lifting hooks 30, 32 may be, for example, a one piece metal stamping.

Figure 2:
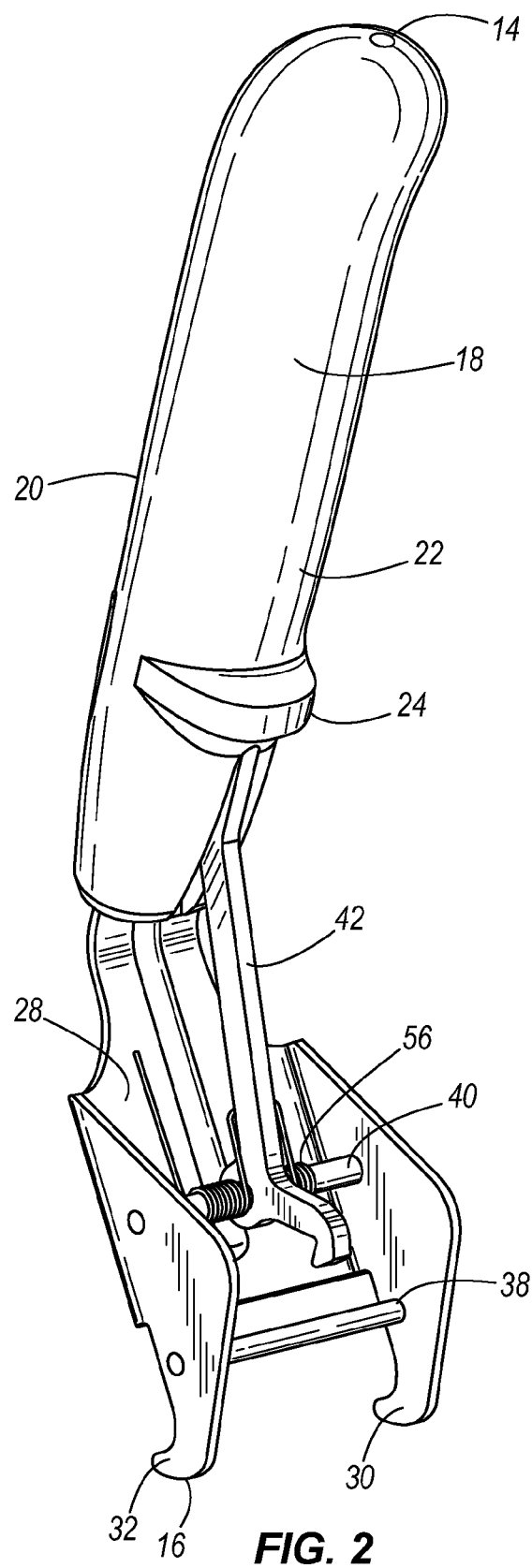
FIG. 2 is a rear perspective view of the tool shown in FIG. 1.

A first pin, or support pin 38, extends laterally across the support arm 28 between the lifting hooks, 30, 32. Referring to FIG. 2, the engagement end 16 further includes a second pin, or pivot pin 40, extending laterally across the support arm 28 between the lifting hooks, 30, 32. The pivot pin 40 is substantially parallel to the support pin 38. In the illustrated embodiment, the support pin 38 and pivot pin 40 provide additional structural rigidity to the support arm 28 and the lifting hooks 30, 32.

Figure 3:
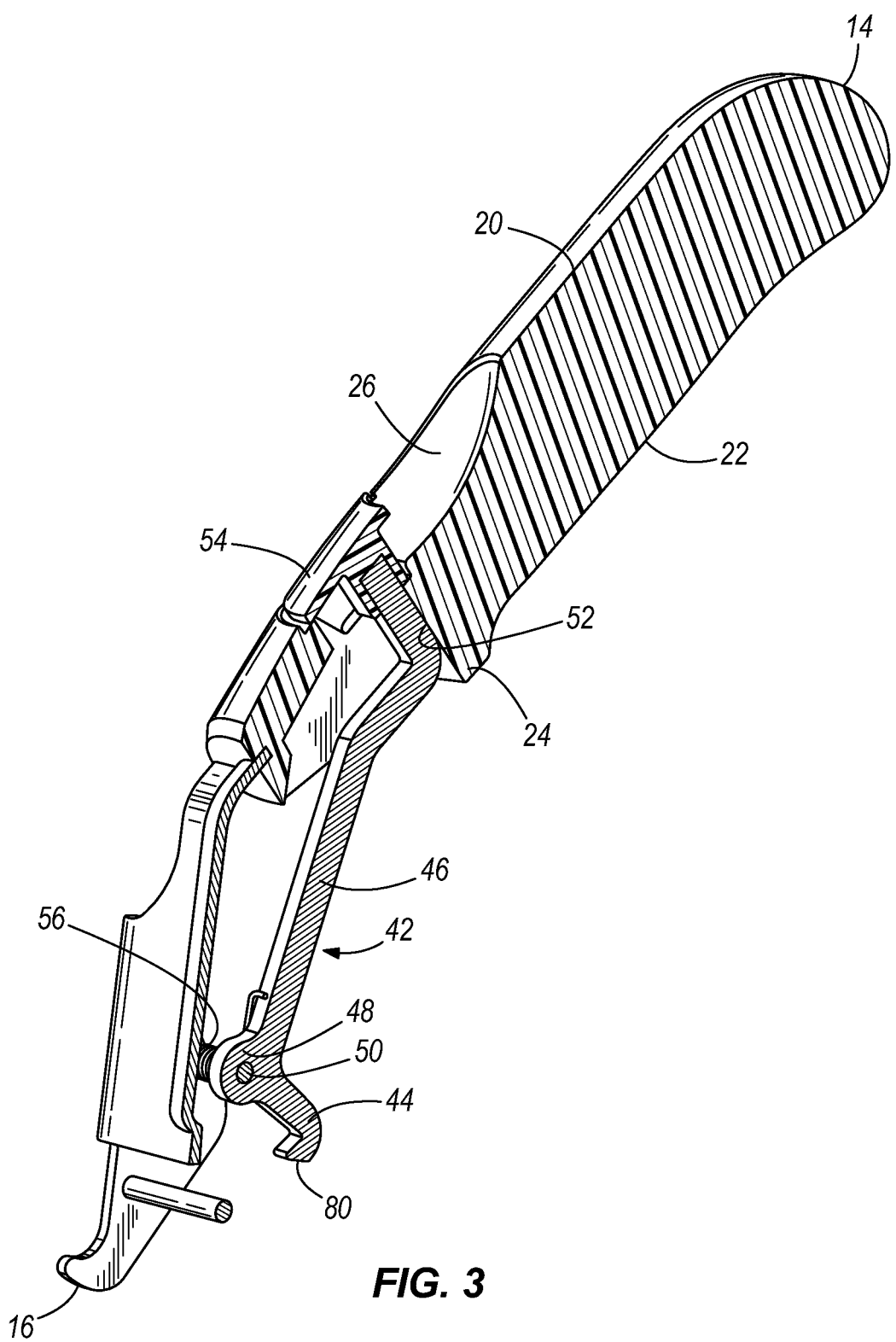
FIG. 3 is a cross section of the tool shown in FIG. 1.

The pivot pin 40 defines an axis about which a latch member 42 pivots. As shown in FIG. 3, the latch member 42 includes a latching hook 44, an actuation arm 46, and a pivot lobe 48 disposed between the latching hook 44 and the actuation arm 46. The pivot pin 40 passes through a pivot aperture 50 defined by the pivot lobe 48. As illustrated in FIG. 3, the actuation arm 46 extends from the lobe 48 through a slot 52 defined in the handle 18 and extends upwardly through the thumb recess 26. A button 54 is coupled to the actuation arm 46 and positioned in the thumb recess 26. A user may actuate the latch member 42 by pushing the button 54. When the user pushes the button 54 forwardly, in the direction of the engagement end 16, the latching hook 44 pivots in the direction of the handle end 14 toward an open position. As shown in FIGS. 2 and 3, a coil spring 56 is wrapped around the pivot pin 40 and engages the actuation arm 46 of the latch member 42. The coil spring 56 biases the latch hook 44 in the direction of the engagement end toward a closed position and biases the button 54 in the direction of the handle end 14.

FIG. 4 illustrates the grill insert 12 insertable into and removable from the grill 13 or 15 by the tool 10. The grill insert 12 is configured, for example, to rest upon or within a complementary-shaped ring 57 (FIGS. 14 and 15) in a gas, charcoal or other grill. The grill insert 12 includes a substantially circular outer ring 58. Multiple grate members 60 are disposed across the circular outer ring 58. In the illustrated embodiment, the grate members 60 are substantially parallel to each other, though, in other embodiments, they may have a different orientation (e.g., they may cross). The grill insert 12 may be used, for example, to grill steaks, hamburgers, chicken, other meats, foods, etc.

The grill insert 12 includes a lifting member 62 that extends radially outwardly from the outer ring 58. In the illustrated embodiment, the lifting member 62 is substantially rectangular, with a distal edge 64, a first side edge 66, and a second side edge 68. The lifting member 62 defines a lateral groove 70, extending between the edges 66, 68. A first lifting ear 72 and a second lifting ear 74 project outwardly from the edges 66, 68, respectively. In the illustrated construction, each lifting ear 72 and 74 has a shape 76 (e.g., a semi-circular cross section) corresponding to the shape of the lifting hooks 30, 32.

Figure 5:
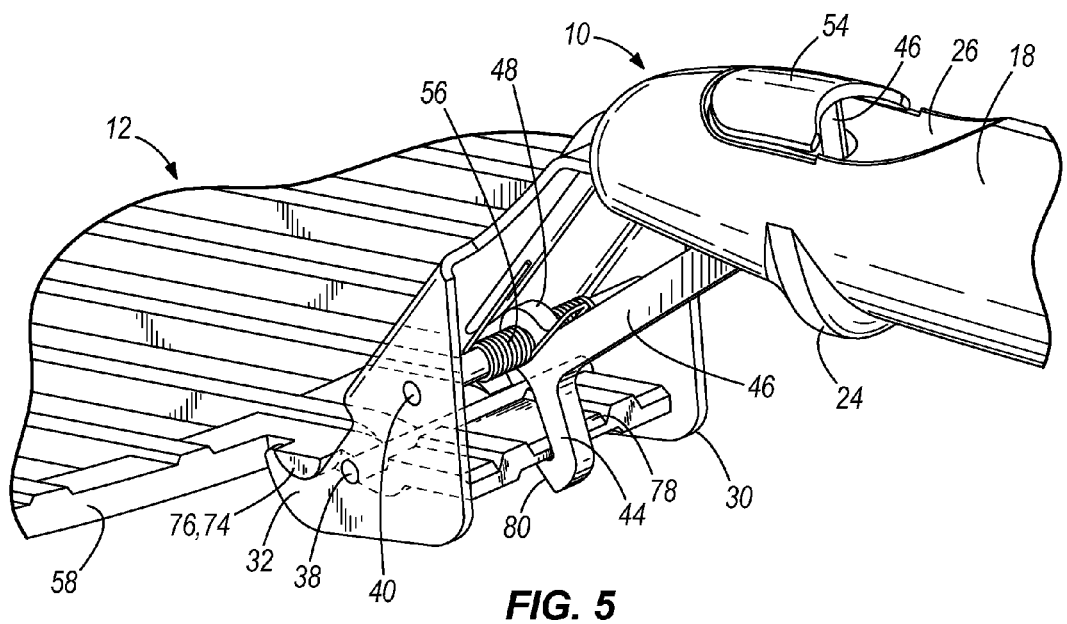
FIG. 5 is a perspective view of the tool shown in FIG. 1 coupled to the portion of the cooking insert shown in FIG. 4.

FIG. 5 illustrates a portion of the tool 10 engaged to the lifting member 62 of the grill insert 12. As shown in FIG. 5, the lifting hooks 30, 32 of the tool 10 engage and substantially conform to the shape 76 of the lifting ears 72, 74. With the lifting hooks 30, 32 engaged to the lifting ears 72, 74, the support pin 38 lies within the lateral groove 70 of the lifting member 62. Finally, the latching hook 44 is selectively engageable to the distal edge 64 of the lifting member 62. With the button 54 released, as shown in FIG. 5, the coil spring 56 biases the latching hook 44 into engagement with the distal edge 64. Bevels 78 on the distal edge 64 and a sloped bottom portion 80 of the latching hook 44 allow the latching hook 44 to snap into engagement with the distal edge 64 without actuation of the button 54 by a user.

With the latching hook 44 engaged to the distal edge 64, the support pin 38 within the lateral groove 70, and the lifting hooks 30, 32 engaged to the lifting ears 72, 74, the tool 10 is positively engaged to the lifting member 62. A user may lift up on the handle 18 to raise the grill insert 12, or a user may support the entire grill 12 insert by the handle 18.

In order to release the grill insert 12, such as when replacing it within a grill 13 or 15, the grill insert 12 is lowered into the desired position. The user then pushes the button 54 forwardly, in the direction of the engagement end 16, causing the latch member 42 to rotate, thereby disengaging the latch hook 44 from the distal edge 64 of the lifting member 62. With the latch hook 44 disengaged, the user can rotate the tool 10 such that the support pin 38 is clear of the lateral groove 70, and the lifting hooks 30, 32 can be rotated out of engagement with the lifting ears 72, 74.

FIGS. 6-13 illustrate various inserts that may used in place of the grill insert 12 shown in FIGS. 4-5 on the grill 13 or 15 of FIGS. 14 and 15. Each insert of FIGS. 6-13 includes a lifting member of substantially the same configuration as the lifting member 62 of the insert 12, as described and illustrated with respect to FIGS. 4-5.

Figure 6:
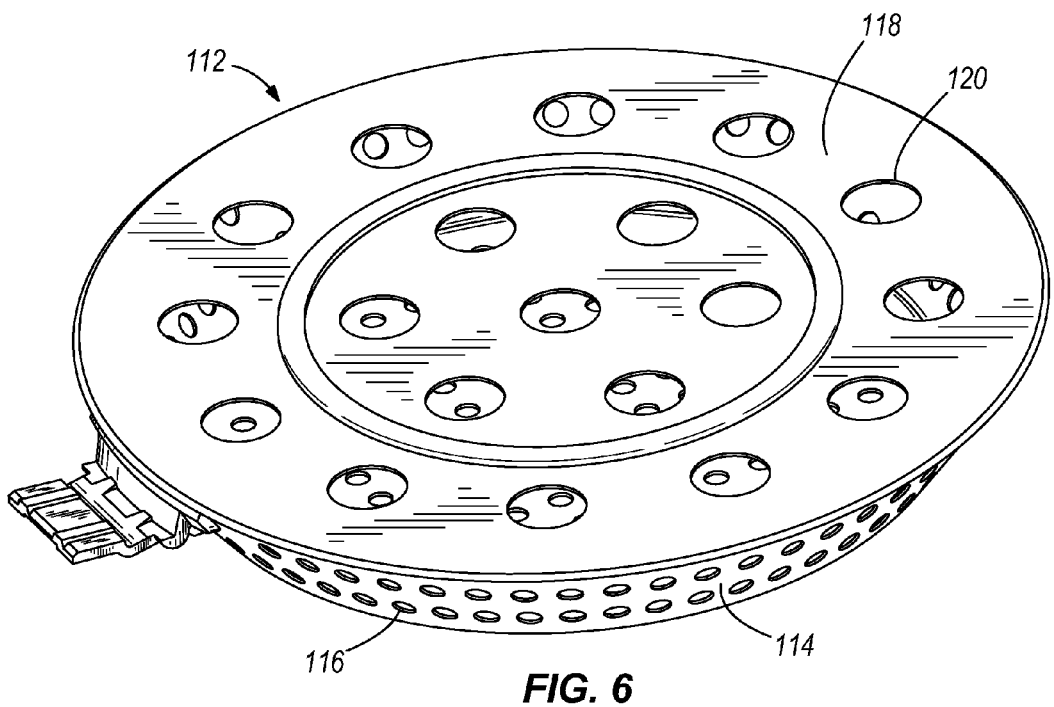
FIG. 6 is a perspective view of another grill insert, such as a pepper roaster insert.

FIG. 6 illustrates a pepper roaster insert 112 that may be used, for example, to roast peppers, other vegetables, etc. on the grill. The pepper roaster insert 112 includes a pan portion 114 that defines multiple drain apertures 116, as well as a lid portion 118 that defines multiple vent apertures 120.

Figure 7:
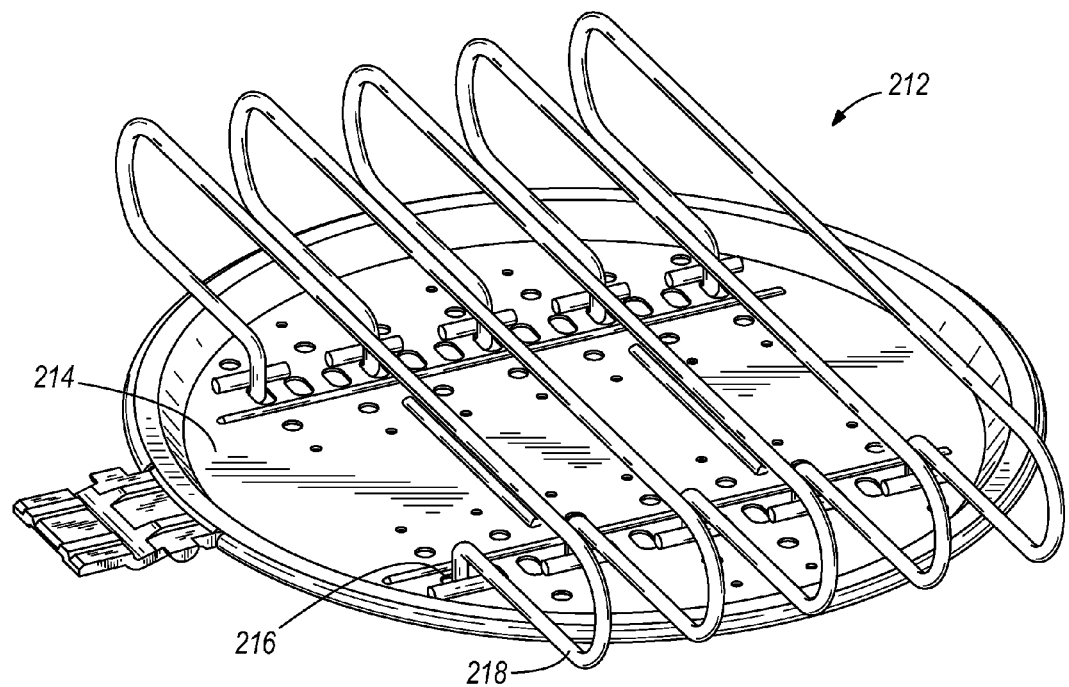
FIG. 7 is a perspective view of yet another grill insert, such as a rib rack insert.

FIG. 7 illustrates a rib rack insert 212 that may be used, for example, to hold multiple portions (or "racks") of rib meat. The rib rack insert 212 includes a substantially planar base portion 214. The base portion 214 defines multiple mounting apertures 216. The mounting apertures 216 are configured to receive resilient wire rack members 218. The wire rack members 218 are configured to support the ribs or other meat to be cooked.

Figure 8:
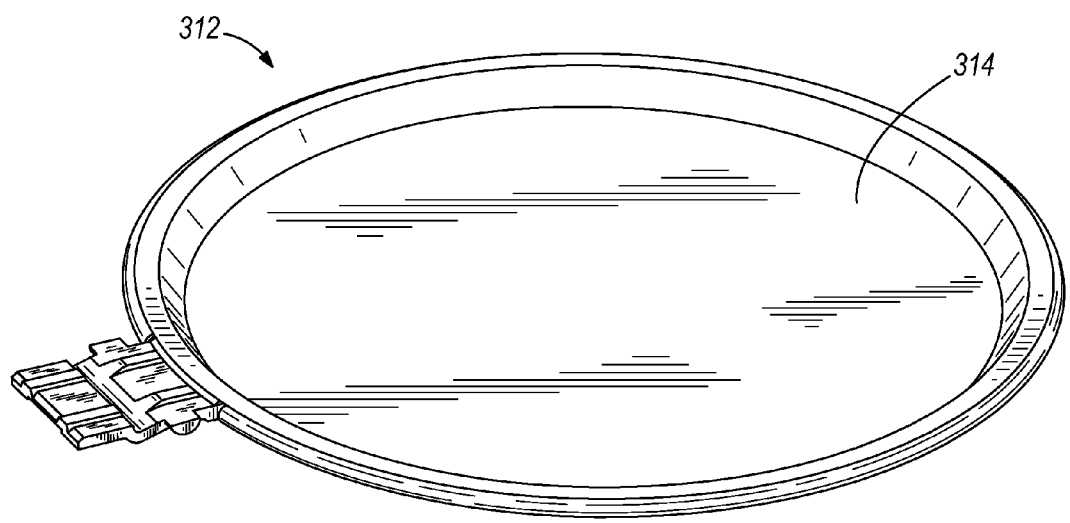
FIG. 8 is a perspective view of a further grill insert, such as a baking pan insert.

FIG. 8 illustrates a baking pan insert 312. The baking pan insert 312 includes a shallow, non-perforated pan 314. The pan 314 is configured, for example, to bake cookies, biscuits, or chicken.

Figure 9:
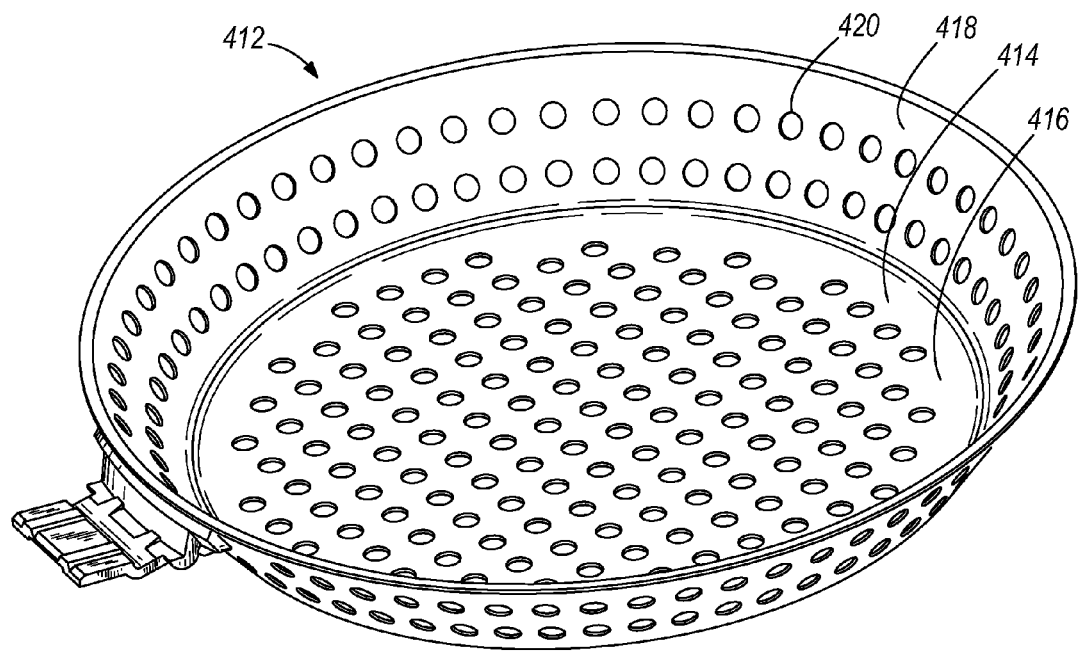
FIG. 9 is a perspective view of another grill insert, such as a vegetable tray insert.

FIG. 9 illustrates a vegetable tray insert 412. The vegetable tray insert 412 includes a pan 414 with a flat bottom 416 and a sloped rim 418. Both the flat bottom 416 and sloped rim 418 define perforations 420.

Figure 10:
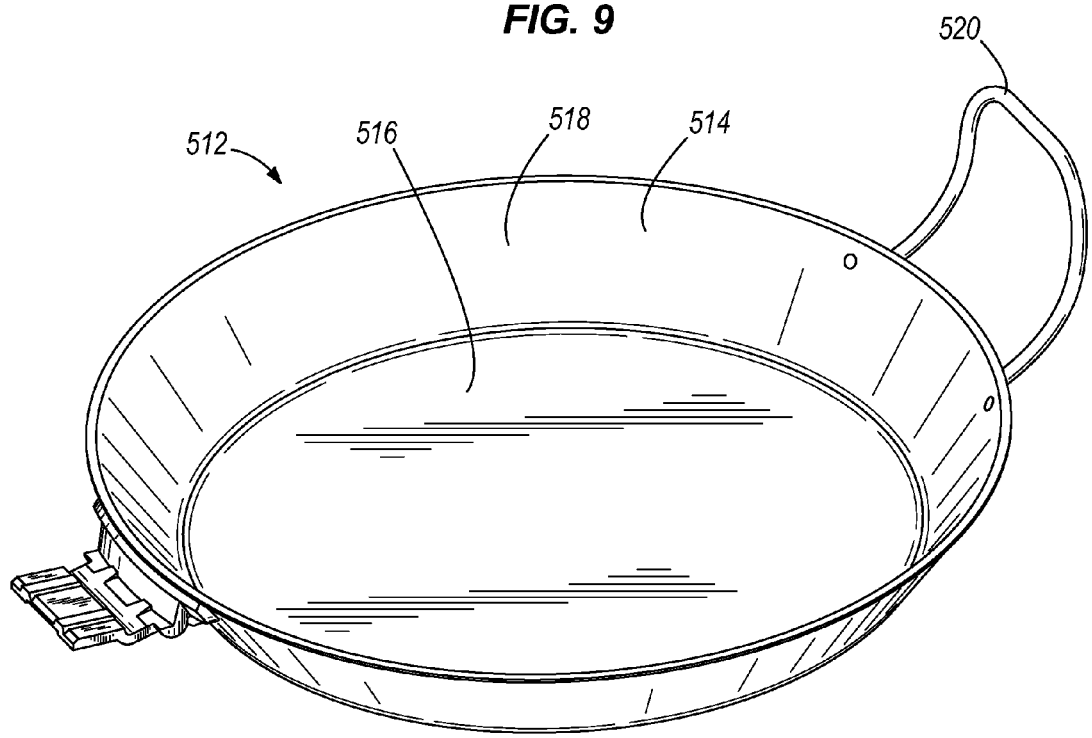
FIG. 10 is a perspective view of yet another grill insert, such as a wok insert.

FIG. 10 illustrates a wok insert 512. The wok insert 512 includes a pan 514 with a flat bottom 516 and a sloped rim 518. A handle 520 is coupled to the sloped rim. The pan portion 514 is configured, for example, for stir-frying vegetables, meats, etc.

Figure 11:
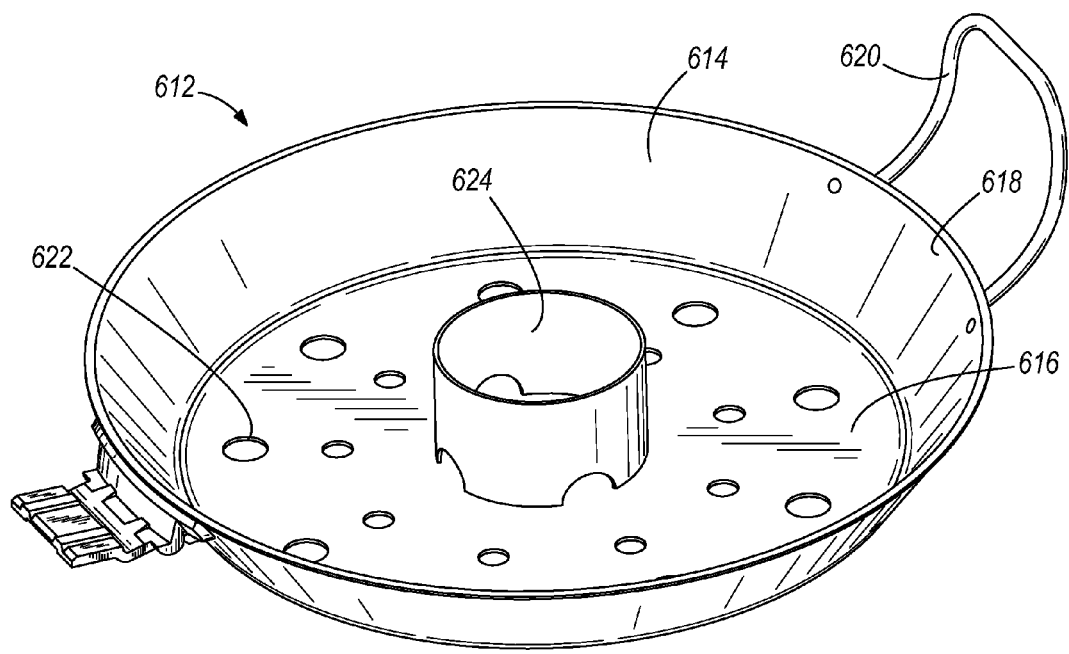
FIG. 11 is a perspective view of a further grill insert, such as a chicken roaster insert.

FIG. 11 is a perspective view of a chicken roaster insert 612. The chicken roaster insert 612 includes a pan 614 having a flat bottom 616 and sloped rim 618. A handle 620 is coupled to the sloped rim 618. The flat bottom 616 defines a plurality of apertures 622 for draining grease. A chicken-support cylinder 624 is disposed on the flat bottom 616. The chicken-support cylinder 624 is configured to raise a chicken or other carcass off of the flat bottom 616 to promote crispiness and uniform cooking.

Figure 12:
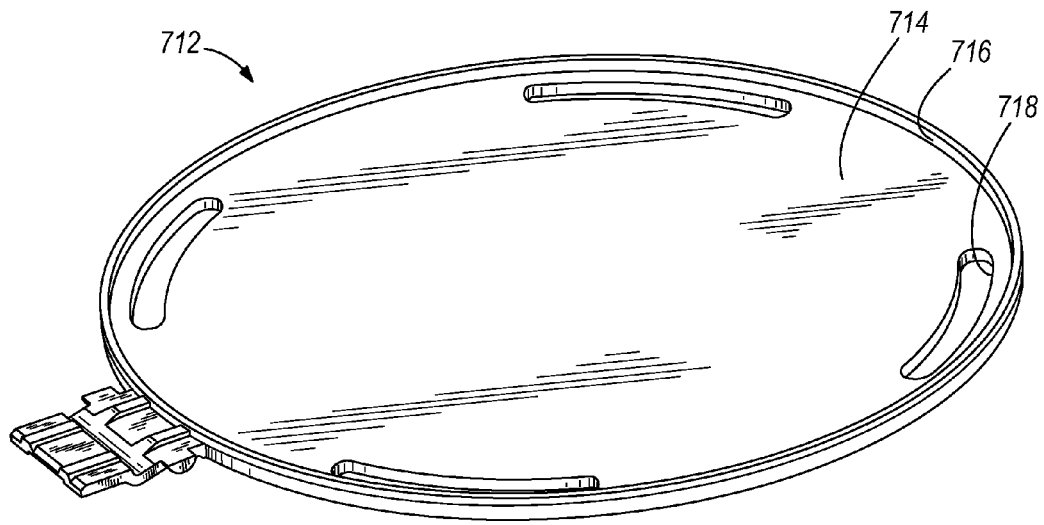
FIG. 12 is a perspective view of another grill insert, such as a griddle insert.

FIG. 12 is a perspective view of a griddle insert 712. The griddle insert 712 includes a substantially planar, cast-iron base 714. A short lip 716 is formed around the base 714. The base 714 defines a plurality of elongated cutouts 718 for example, to drain oil, grease, excess pancake batter, etc.

Figure 13:
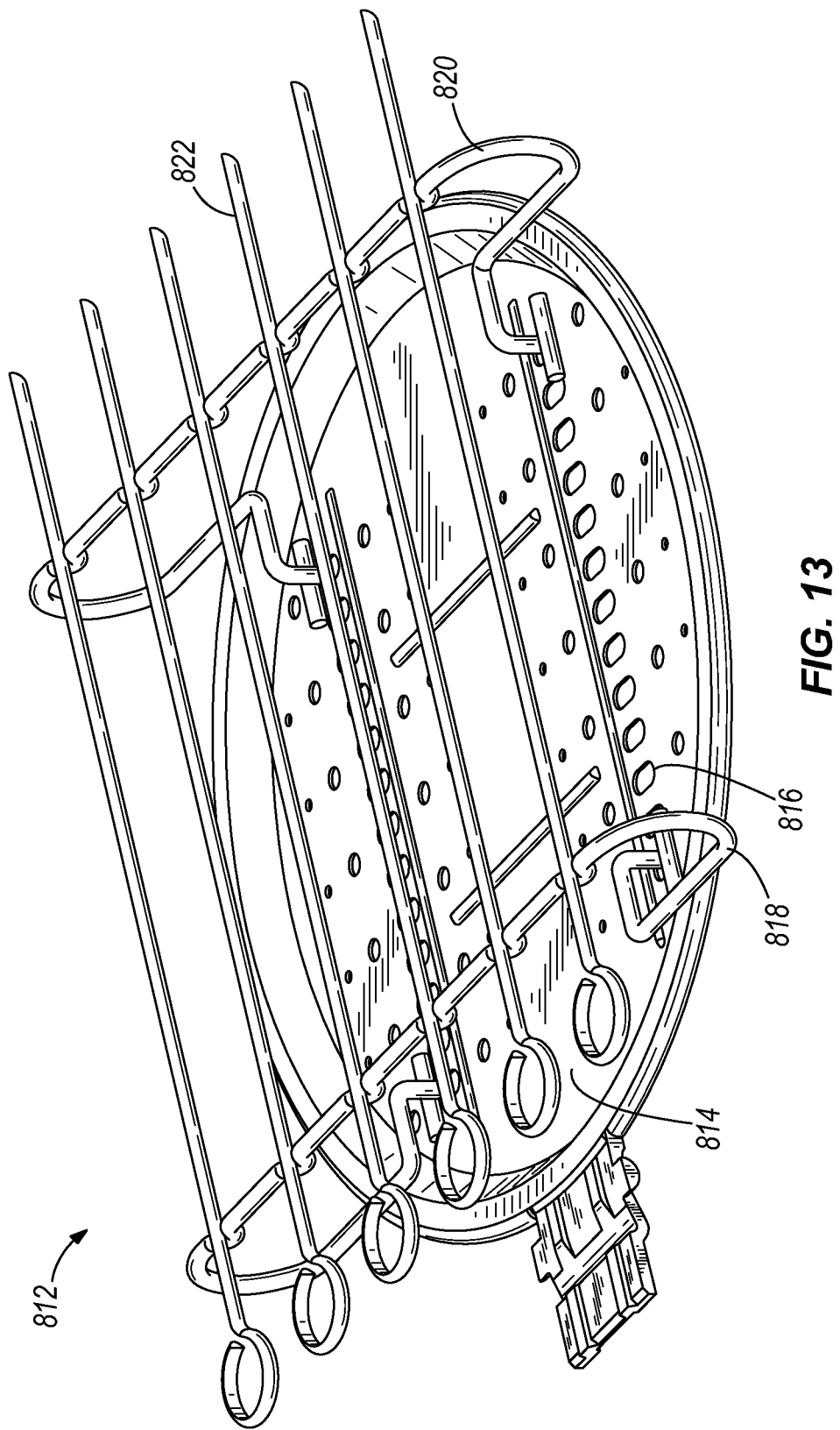
FIG. 13 is a perspective view of yet another grill insert, such as a skewer rack insert.

FIG. 13 is a perspective view of a skewer rack insert 812. The skewer rack insert 812 includes a substantially planar base portion 814. The base portion 814 defines multiple mounting apertures 816. The mounting apertures 816 are configured to receive a first rack member 818 and a second rack member 820. The rack members 818 and 820 configured to support multiple skewers 822, such as are used when making shish kebab.

FIG. 14 illustrates the grill 13 with the grill insert 12. The grill 13 has a rectangular outer profile 914. The grill 13 may be used interchangeable with any of the various inserts 12, 112, 212, 312, 412, 512, 612, 712, 812. Depending on the size of the surface of the grill 13 or 15, the grill 13 may include more than one ring 57 to receive and cook with more than one insert at a time.

FIG. 15 illustrates the grill 15 with the grill insert 12. The grill 15 has a round outer profile 916. The grill 15 may be used with any of the inserts 12, 112, 212, 312, 412, 512, 612, 712, 812.

Figure 16:
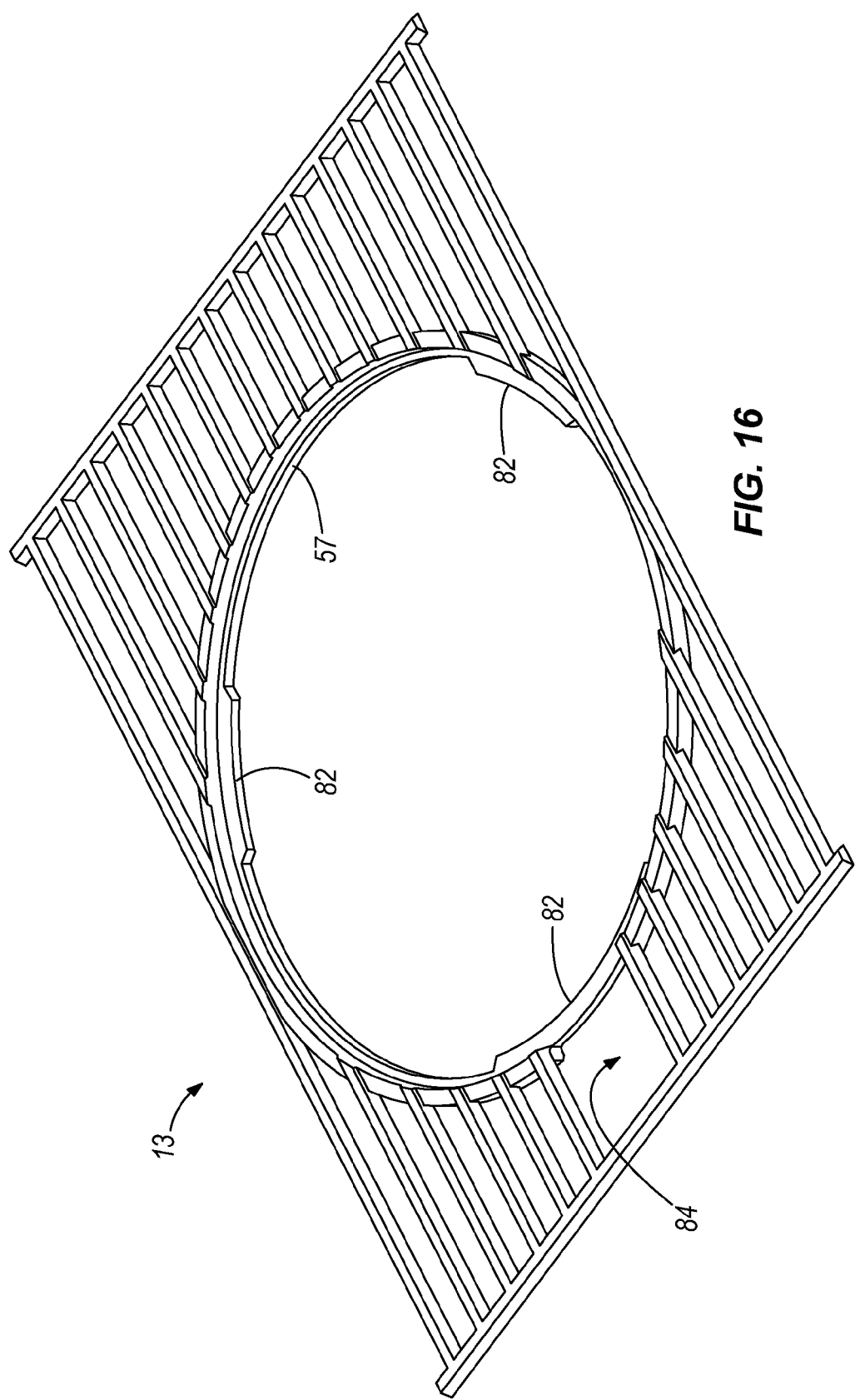
FIG. 16 is a perspective view of the rectangular grill grate of FIG. 14.
Figure 17:
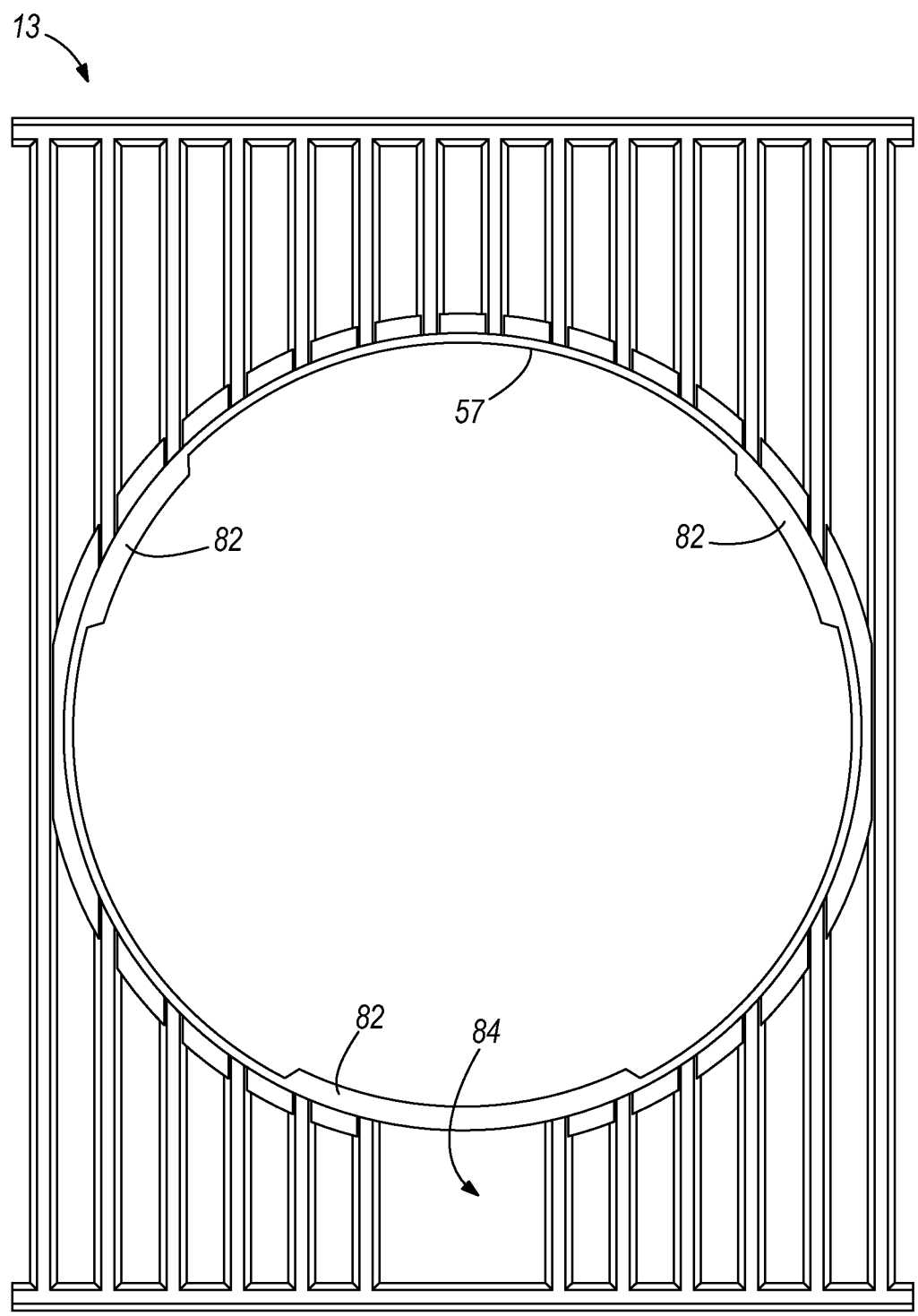
FIG. 17 is a top view of the rectangular grill grate of FIG. 14.
Figure 18:
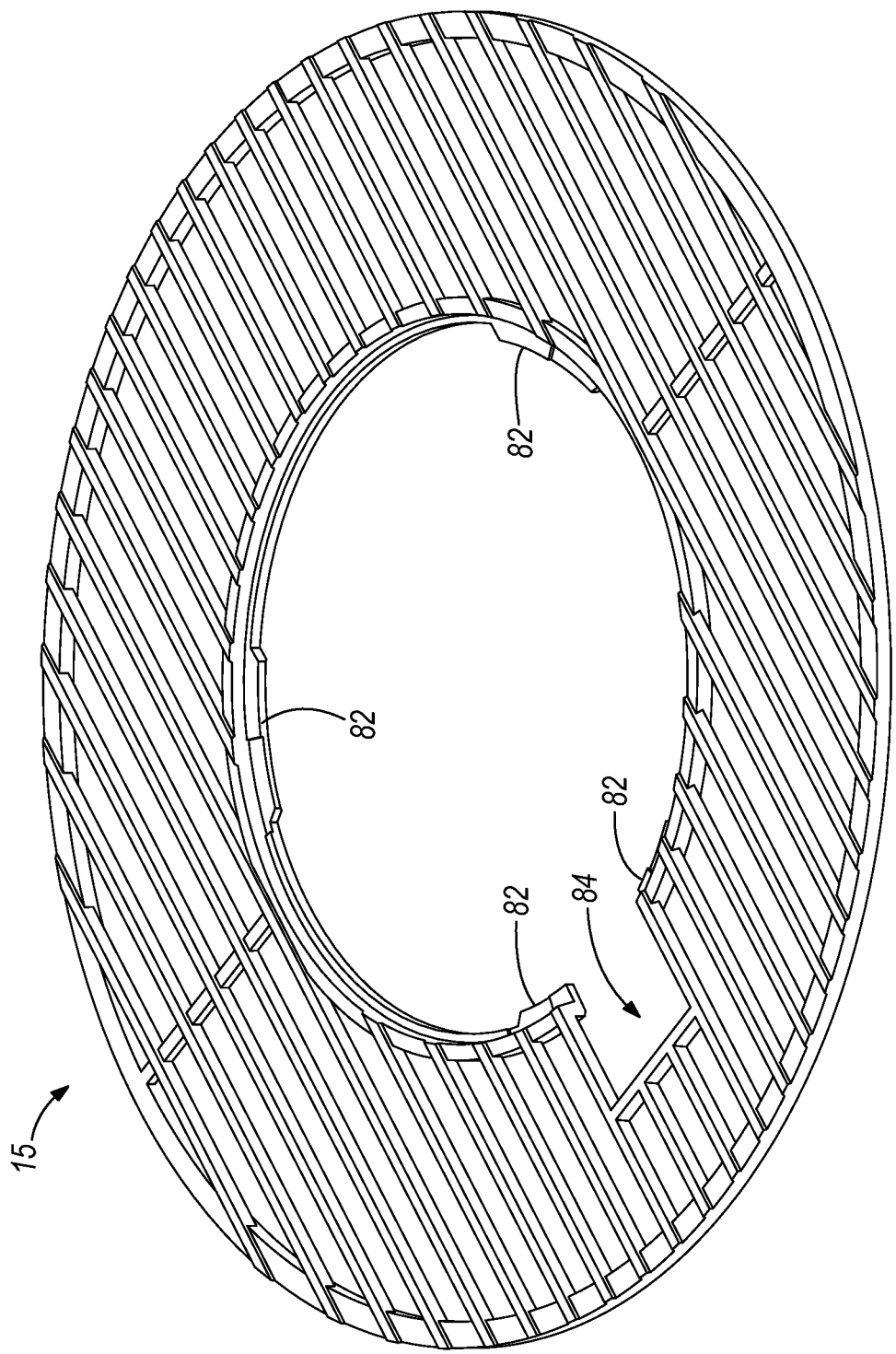
FIG. 18 is a perspective view of the round grill grate of FIG. 15.
Figure 19:
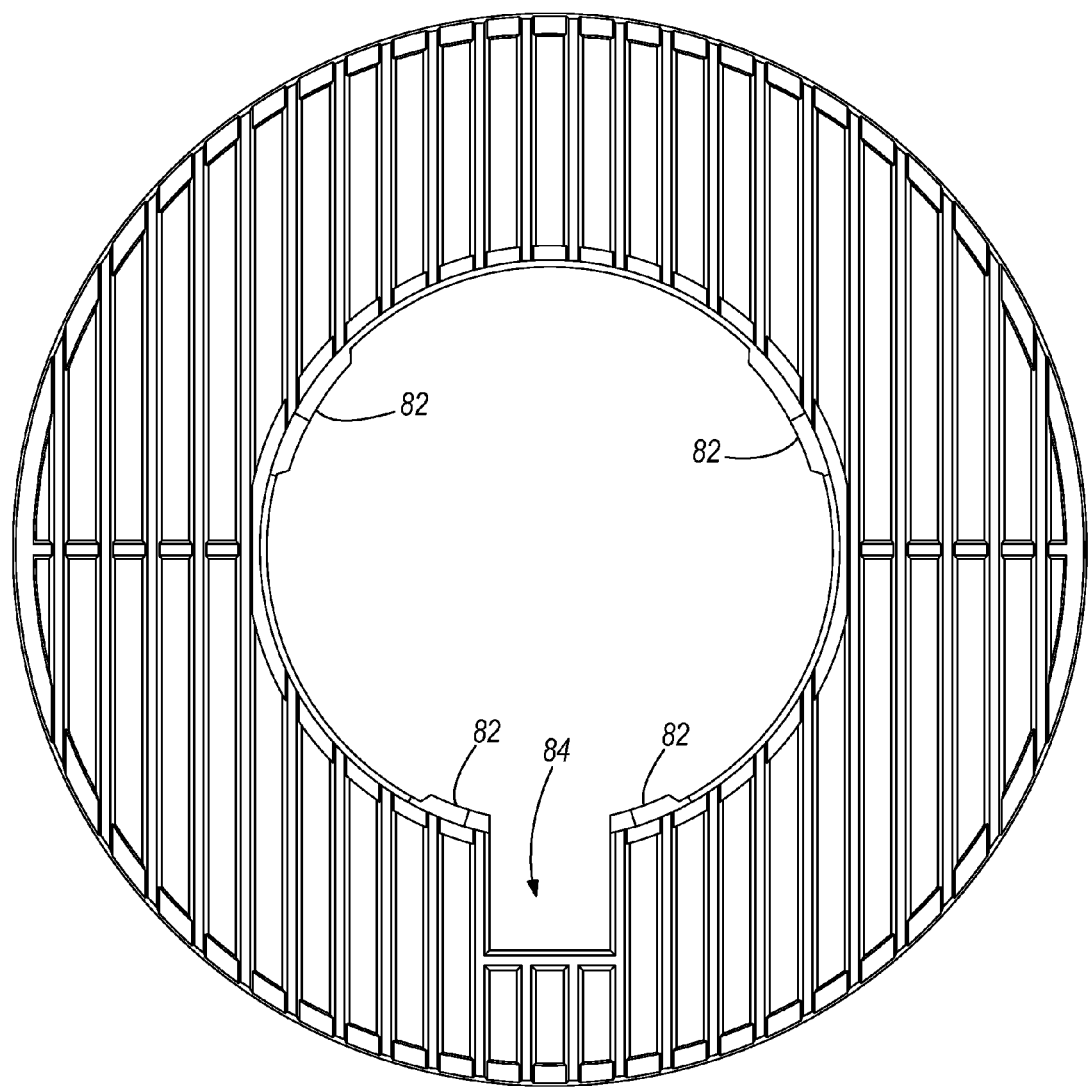
FIG. 19 is a top view of the round grill grate of FIG. 15.

Referring to FIGS. 16-17 and 18-19, each of the grills 13 and 15 includes circumferentially arranged support members 82 extending radially inwardly of the ring 57 to support various inserts within the ring 57. In the embodiment of FIGS. 16-17, three support members 82 are provided. In the embodiment of FIGS. 18-19, four support members are provided. In other embodiments (not shown), other numbers and arrangements of support members 82 may be provided. The grills 13 and 15 further define a clearance cutout 84 extending radially outwardly of the ring 57. The clearance cutout 84 is configured to receive the lifting members 62 of the various grill inserts.

Thus, the invention may generally provide, among other things, a cooking system and/or components of the system including a grill, grill inserts and a tool for use with grill inserts. Although the invention has been described in detail with reference to certain preferred embodiments, variations and modifications exist within the scope and spirit of one or more independent aspects of the invention as described.

One or more independent features or independent advantages of the invention may be set forth in the following claims.

The invention claimed is:

1. A tool for removing an interchangeable cooking insert from a grill, the tool comprising:
   a handle extending from a handle end toward an engagement end;
   a support arm extending from the handle toward the engagement end, the support arm having a first lateral edge defining a first lifting hook and a second lateral edge defining a second lifting hook, the first lifting hook and second lifting hook configured to engage a portion of the cooking insert;
   a support pin extending across the support arm between the first lateral edge and the second lateral edge, the support pin configured to engage a portion of an interchangeable cooking insert; and
   a latch member pivotally coupled to one of the support arm and the handle, the latch member including a first end selectively engageable with a portion of the cooking insert to grip the cooking insert and a second end extending through the handle for actuation of the latching member by a user.

2. The tool of claim 1, wherein the handle defines a slot, the slot receiving the second end of the latching member.

3. The tool of claim 2, wherein the handle defines a recess substantially surrounding the slot, the recess for receiving a user's thumb for actuation of the latching member.

4. The tool of claim 1, further comprising a pivot pin extending through the one of the handle and the support arm, the latching member being pivotally coupled to the pivot pin.

5. The tool of claim 1, further comprising a biasing member coupled to the latching member.

6. The tool of claim 5, wherein the biasing member biases the latching member first end toward the engagement end.

7. The tool of claim 1, wherein the latch member first end defines a latch hook, the latch hook being configured to engage a distal edge of the cooking insert.

8. The tool of claim 7, wherein the latch hook is configured to engage the distal edge of the cooking insert simultaneously with the support pin, the first lifting hook, and the second lifting hook engaging portions of the cooking insert.

9. The tool of claim 7, wherein the latch member second end defines an actuation arm.

10. The tool of claim 8, wherein the latch member defines a pivot lobe between the latch hook and the actuation arm.

11. The tool of claim 1, wherein the first lifting hook and second lifting hook are unitarily formed as one piece.

12. An interchangeable cooking insert for use with a grill, the insert comprising:
    a cooking surface surrounded by an outer ring; and
    a lifting member extending outwardly radially from the outer ring in cantilever fashion, the lifting member including a distal end, a first lateral edge, and a second lateral edge, a lateral groove extending from the first edge to the second edge, a first lifting ear projecting outwardly from the first edge, and a second lifting ear projecting outwardly from the second edge, wherein the first and the second lifting ears are located between the outer ring and the lateral groove.

13. The insert of claim 12, wherein the first lifting ear has a semi-circular cross section.

14. A grill accessory combination comprising,
    an interchangeable cooking insert including
        a cooking surface surrounded by an outer ring, and
        a lifting member extending outwardly radially from the outer ring in cantilever fashion, the lifting member including a distal end, a first lateral edge, and a second lateral edge, a lateral groove extending from the first edge to the second edge, a first lifting ear projecting outwardly from the first edge, and a second lifting ear projecting outwardly from the second edge; and
    a tool including
        a handle extending from a handle end toward an engagement end,
        a support arm extending from the handle toward the engagement end, the support arm having a first lateral edge defining a first lifting hook and a second lateral edge defining a second lifting hook, the first lifting hook being configured to engage the first lifting ear, the second lifting hook being configured to engage the second lifting ear,
a support pin extending across the support arm between the first lateral edge and the second lateral edge, and
a latch member pivotally coupled to one of the support arm and the handle, the latch member being configured to selectively engage the distal end while the support pin is at least partially disposed in the lateral groove.

15. The combination of claim 14, wherein the first lifting ear has a semi-circular cross section.

16. The combination of claim 15, wherein the first lifting hook defines a semi-circular recess substantially conforming to the first lifting ear.

17. The combination of claim 14, wherein the tool further includes a pivot pin extending through the one of the handle and the support arm, the latching member pivotally coupled to the pivot pin.

18. The combination of claim 14, wherein the tool further includes a biasing member coupled to the latching member.

19. The combination of claim 18, wherein the biasing member biases the latch member toward the engagement end.

20. The combination of claim 14, wherein the handle defines a slot, the slot receiving a portion of the latching member for actuation by a user.

* * * * *